US011072149B2

(12) United States Patent
Iyo et al.

(10) Patent No.: US 11,072,149 B2
(45) Date of Patent: *Jul. 27, 2021

(54) BIAXIALLY DRAWN COLORED POLYESTER FILM FOR LAMINATING METAL SHEET

(71) Applicant: TEIJIN FILM SOLUTIONS LIMITED, Tokyo (JP)

(72) Inventors: Naoki Iyo, Tokyo (JP); Shinji Yano, Tokyo (JP)

(73) Assignee: TOYOBO CO., LTD., Osaka (JP)

( * ) Notice: Subject to any disclaimer, the term of this patent is extended or adjusted under 35 U.S.C. 154(b) by 274 days.

This patent is subject to a terminal disclaimer.

(21) Appl. No.: 16/219,369

(22) Filed: Dec. 13, 2018

(65) Prior Publication Data

US 2019/0184681 A1  Jun. 20, 2019

(30) Foreign Application Priority Data

Dec. 15, 2017 (JP) .............................. JP2017-240542

(51) Int. Cl.
| | |
|---|---|
| *B32B 15/09* | (2006.01) |
| *B32B 27/36* | (2006.01) |
| *B32B 27/20* | (2006.01) |
| *B32B 38/00* | (2006.01) |
| *B32B 27/08* | (2006.01) |
| *C08L 23/14* | (2006.01) |
| *C08L 23/08* | (2006.01) |
| *C08L 23/26* | (2006.01) |
| *C08L 67/02* | (2006.01) |
| *C08L 67/03* | (2006.01) |
| *C08L 23/30* | (2006.01) |
| *C08K 3/013* | (2018.01) |
| *C08K 3/22* | (2006.01) |
| *C08K 3/30* | (2006.01) |
| *C08K 3/26* | (2006.01) |

(52) U.S. Cl.
CPC .............. *B32B 15/09* (2013.01); *B32B 27/20* (2013.01); *B32B 27/36* (2013.01); *B32B 38/0012* (2013.01); *B32B 27/08* (2013.01); *B32B 2038/0028* (2013.01); *B32B 2250/02* (2013.01); *B32B 2250/03* (2013.01); *B32B 2250/244* (2013.01); *B32B 2307/402* (2013.01); *B32B 2307/518* (2013.01); *B32B 2307/728* (2013.01); *B32B 2307/752* (2013.01); *B32B 2311/00* (2013.01); *B32B 2311/16* (2013.01); *B32B 2311/24* (2013.01); *B32B 2311/30* (2013.01); *B32B 2323/04* (2013.01); *B32B 2367/00* (2013.01); *B32B 2391/00* (2013.01); *B32B 2439/66* (2013.01); *C08K 3/013* (2018.01); *C08K 2003/2227* (2013.01); *C08K 2003/2241* (2013.01); *C08K 2003/265* (2013.01); *C08K 2003/3045* (2013.01); *C08L 23/0846* (2013.01); *C08L 23/0869* (2013.01); *C08L 23/147* (2013.01); *C08L 23/26* (2013.01); *C08L 23/30* (2013.01); *C08L 67/02* (2013.01); *C08L 67/03* (2013.01); *C08L 2203/16* (2013.01); *Y10T 428/31681* (2015.04); *Y10T 428/31786* (2015.04)

(58) Field of Classification Search
None
See application file for complete search history.

(56) References Cited

U.S. PATENT DOCUMENTS

| | | | | |
|---|---|---|---|---|
| 5,667,575 A | * | 9/1997 | Rundquist | .................. C08J 3/03 |
| | | | | 106/271 |
| 6,071,599 A | * | 6/2000 | Kosuge | .................. B32B 15/08 |
| | | | | 428/213 |
| 6,420,010 B1 | * | 7/2002 | Hasegawa | ............... B32B 27/20 |
| | | | | 428/141 |
| 8,652,451 B2 | * | 2/2014 | Bui | .......................... A61Q 1/02 |
| | | | | 424/63 |
| 10,377,111 B2 | * | 8/2019 | Iyo | .......................... B32B 15/09 |
| 10,589,490 B2 | * | 3/2020 | Sakamoto | ........... B29C 48/0018 |
| 10,661,537 B2 | * | 5/2020 | Sato | ........................ B32B 15/18 |
| 2004/0219316 A1 | * | 11/2004 | Takahashi | .................. C08J 5/18 |
| | | | | 428/35.7 |
| 2008/0261063 A1 | * | 10/2008 | Yamanaka | ................ B32B 1/02 |
| | | | | 428/483 |
| 2009/0145898 A1 | * | 6/2009 | Takatsu | ................... B32B 15/08 |
| | | | | 220/62.22 |
| 2016/0009444 A1 | * | 1/2016 | Nakagawa | ................ B32B 1/08 |
| | | | | 206/524.2 |
| 2020/0172308 A1 | * | 6/2020 | Kitagawa | ................ B32B 15/09 |
| 2020/0338863 A1 | * | 10/2020 | Kawai | .................... B65D 25/34 |
| 2020/0377274 A1 | * | 12/2020 | Kawai | .................. B32B 37/182 |

FOREIGN PATENT DOCUMENTS

| | | | | |
|---|---|---|---|---|
| JP | | 11-342577 A | | 12/1999 |
| JP | | 11-348218 A | | 12/1999 |
| JP | | 2006-130676 A | * | 5/2006 |
| JP | | 2017-030210 A | * | 2/2017 |
| JP | | 2017-30231 A | | 2/2017 |
| WO | WO | 2015/150073 A | * | 10/2015 |
| WO | WO | 2016/136099 A | * | 9/2016 |

* cited by examiner

*Primary Examiner* — Vivian Chen
(74) *Attorney, Agent, or Firm* — Sughrue Mion, PLLC

(57) ABSTRACT

A biaxially drawn colored polyester film includes at least two layers: a surface layer (layer A) mainly composed of polyester having a melting point TmA of 230 to 260° C. and modified polyolefin wax, layer A having a polymer component with intrinsic viscosity of 0.46 or more, the modified polyolefin wax with an amount of 0.2 wt % or more based on the weight of the composition, coloring pigment with an amount of 10 wt % or less, and a water contact angle of less than 70° on an outer surface; and a substrate layer (layer B) mainly composed of polyester having a melting point TmB of 230 to 260° C. and coloring pigment, layer B having a polymer component with intrinsic viscosity of 0.46 or more and the coloring pigment with an amount of more than 10 wt % and 50 wt % or less; wherein |TmB−TmA| is 4° C. or less.

8 Claims, No Drawings

BIAXIALLY DRAWN COLORED POLYESTER FILM FOR LAMINATING METAL SHEET

TECHNICAL FIELD

The present invention relates to a biaxially drawn colored polyester film for laminating and forming metal sheet.

BACKGROUND ART

Metal cans are generally coated in order to prevent corrosion of the inner and outer surfaces. In recent years, for the purposes of simplifying the process, improving hygiene, preventing pollution, etc., a method in which a metal can is laminated with a thermoplastic resin film, such as a polyester film, has been performed for imparting rust resistance without using an organic solvent. That is, a thermoplastic resin film is laminated on a metal sheet of tin, tin-free steel, aluminum, or the like, and then used for food can, beverage can, or aerosol can applications in which cans are subjected to severe forming processing, such as in the case of drawn cans and thin-drawn cans. In terms of cost reduction, cans for these applications have been produced through thin-drawing and ironing under even severer processing conditions.

In the case where such severe forming processing is performed, with the thinning of the metal sheet, the resin film is also thinned. The outer surface of a food can or a beverage can is generally printed in order to improve the design features. In a can formed from a resin film-laminated metal sheet, a resin film containing white or various color pigments is laminated on the metal sheet, and the laminated sheet is used as the printing substrate in order to conceal the color of the metal sheet. In the case where such a laminated metal sheet is subjected to severe processing, the resin thickness significantly decreases, wherein the absolute quantity of the added pigment in the thickness direction decreases, resulting in a problem in that the substrate does not exhibit sufficient concealability. In the case where a large amount of pigment is previously added to the resin film with forethought of this problem, the strength of the resin film decreases. Accordingly, the resin film becomes easily chipped off or scratched during processing, and it further happens that the resin film cracks and peels off. Thus, it is difficult to improve the concealability while keeping the strength of the laminating resin film high at the same time and secure enough formability.

For example, a method in which a biaxially drawn polyester film is laminated on a metal sheet, and the laminate is used as a material for can manufacturing, has been proposed (PTL 1). However, when forming is performed through severer processing, the resin film is chipped off or scratched, or may break in an extreme case. In addition, a method in which an undrawn polyester film is laminated on a metal sheet, and the laminate is used as a material for can manufacturing, has been proposed (PTL 2). However, undrawn films are extremely brittle and thus easily cut during film forming or handling, leading to the problem of poor productivity.

To these problems, PTL 3 proposes a biaxially drawn colored polyester film for laminating and forming metal sheet, which exhibits excellent formability such that even in the case where the film is subjected to severe processing or high-temperature heat treatment as described above, the film is prevented from being chipped off or cracked during forming into a can after lamination; and from which a formed product, such as a can, having excellent concealability, appearance, and printability; and the film requires a water contact angle of 70 to 120°.

However, the laminated metal sheet is formed into a can, and then the outer surface of the can is printed variously. Next, the can body edge is formed in to a final shape using a forming tool. During the forming, insufficient adhesion between printed ink and the film causes peeling off of the ink, and thus there is a problem of appearance defects.

CITATION LIST

Patent Literature

[PTL 1] Japanese Unexamined Patent Application Publication No. Hei 11-342577
[PTL 2] Japanese Unexamined Patent Application Publication No. Hei 11-348218
[PTL 3] Japanese Unexamined Patent Application Publication No. 2017-30231

SUMMARY OF INVENTION

Technical Problem

It was found out in PTL 3, that though adjustment of water contact angle by adding and controlling the amount of polyethylene wax has actually improved the polyester film to a level which enables printing on the surface, the actually printed film has a problem of peeling off of printed ink when subjected to further forming.

Accordingly, the present invention has been made under the above background, and an object of the present invention is to provide a biaxially drawn colored polyester film for laminating and forming metal sheet, which exhibits excellent formability such that even in the case where the film is subjected to severe processing or high-temperature heat treatment as described above, the film is prevented from being chipped off or scratched during forming into a can after lamination; and from which a formed product is obtained, such as a can, having excellent concealability, appearance, and printability and securing adhesion of a printed layer when subjected to forming after printing.

Solution to Problem

According to the research by the present inventors, it has been found that the above problems can be solved by the following configuration.

[1] A biaxially drawn colored polyester film for laminating and forming metal sheet, comprising at least two layers of:
a surface layer (layer A) mainly composed of a polyester having a melting point of 230 to 260° C. and modified polyolefin wax, layer A having a polymer component with intrinsic viscosity of 0.46 or more, a modified polyolefin wax with an amount of 0.2 wt % or more based on the weight of the composition, a coloring pigment with an amount of 10 wt % or less, and a water contact angle on an outer surface of less than 70°; and
a substrate layer (layer B) mainly composed of a polyester having a melting point of 230 to 260° C. and a coloring pigment, layer B having a polymer component with intrinsic viscosity of 0.46 or more and the coloring pigment with an amount of more than 10 wt % and 50 wt % or less;
wherein the melting points of the polyesters of layer A and layer B satisfy the following expression (1):

$$|TmB - TmA| \leq 4° C. \quad (1)$$

wherein TmA represents the melting point of the polyester of layer A, and
TmB represents the melting point of the polyester of layer B.

[2] The biaxially drawn colored polyester film for laminating and forming metal sheet according to [1], wherein the polyester constituting layer B is a copolyester having a melting point of 230 to 255° C.

[3] The biaxially drawn colored polyester film for laminating and forming metal sheet according to [1] or [2], wherein the polyester constituting layer A is a copolyester having a melting point of 230 to 255° C.

[4] The biaxially drawn colored polyester film for laminating and forming metal sheet according to [1], wherein the polyesters each constituting layer A and layer B each are a copolyester having a melting point of 230 to 255° C., and an isophthalic acid-copolymerized polyethylene terephthalate.

[5] The biaxially drawn colored polyester film for laminating and forming metal sheet according to any of [1] to [4], wherein layer A contains 0.2 to 2.0 wt % of the modified polyolefin wax based on the weight of layer A.

[6] The biaxially drawn colored polyester film for laminating and forming metal sheet according to [5], wherein the modified polyolefin wax contains at least one selected from the group consisting of acid-modified polypropylene wax, acid-modified polyethylene wax, oxidized polypropylene wax, and oxidized polyethylene wax.

[7] The biaxially drawn colored polyester film for laminating and forming metal sheet according to any of [1] to [6], wherein the film is laminated on a surface of a metal sheet that will become the outer surface of a container.

Advantageous Effects of Invention

The biaxially drawn colored polyester film for laminating and forming metal sheet of the present invention exhibits excellent formability such that during forming into a can after lamination on the metal sheet, the film on the can wall is hard to be chipped off or cracked, and furthermore, after forming, has excellent concealability, appearance of a formed product such as a can, and printability.

DESCRIPTION OF EMBODIMENTS

Hereinafter, the invention will be described in detail.

A biaxially drawn colored polyester film for laminating and forming metal sheet of the present invention is a laminate film comprising at least two layers: a surface layer (layer A) and a substrate layer (layer B).

The surface layer (layer A) is mainly composed of a polyester having a melting point of 230 to 260° C. The term "mainly composed of" indicates that the total amount of the polyester and the modified polyolefin wax is, for example, 80 wt % or more, preferably 85 wt % or more, more preferably 90 wt % or more, and still more preferably 95 wt % or more, based on the weight of layer A.

The substrate layer (layer B) is mainly composed of a polyester having a melting point of 230 to 260° C. and a coloring pigment. The term "mainly composed of" indicates that the total amount of the polyester and the coloring pigment is, for example, 80 wt % or more, preferably 85 wt % or more, more preferably 90 wt % or more, and still more preferably 95 wt % or more, based on the weight of layer B.

When the melting points of the polyester of layer A and that of layer B are within the ranges described above, the film has excellent formability. When the melting points are lower than the lower limit of the above melting point ranges, film chipping occurs during forming processing. On the other hand, when the melting points are higher than the upper limit of the above ranges, cracks occur.

The biaxially drawn polyester film of the present invention comprises at least two layers of layer A and layer B, and examples of the structure include a two-layer structure of layer A/layer B and a three-layer structure of layer A/layer B/layer A. Furthermore, the film may include a layer in addition to layer A and layer B as long as the object of the present invention is not disturbed. In such a case, at least one surface of the film should be layer A.

The polyester constituting the surface layer (layer A) and the substrate layer (layer B) may be a homopolyester or a copolyester as long as the above-described melting point requirements are satisfied. A preferable example of the homopolyester includes homopolyethylene terephthalate. As the copolyester, any of polyethylene terephthalate copolymers, polyethylene-2,6-naphthalate copolymers, or blends of these or the above-described homopolyester and polybutylene terephthalate may be used. Of these, polyethylene terephthalate copolymers are preferred.

(Homopolyester)

In the present invention, a preferable example of the polyester constituting layer A and/or layer B includes a polyester having a melting point in the range of more than 250° C. to 260° C. or less. Employment of such a polyester provides several formability effects and among them, an effect of preventing film chipping during forming is especially excellent. When the melting point is higher than the upper limit, the film will have poor formability in terms of inability to track drawing during can manufacturing, and cracks will occur in the film. On the other hand, when the melting point is lower than the lower limit, the improving effect of preventing film chipping tends to become low. From such viewpoints, the melting point is more preferably 251 to 260° C., still more preferably 253 to 258° C., and particularly preferably 254 to 257° C.

Examples of such a polyester include homopolyesters, preferably homopolyethylene terephthalate and copolyesters having a relatively high melting point within the above-described melting point range (the amount of copolymerization is relatively small), and preferably copolyethylene terephthalates. In particular, homopolyethylene terephthalate is preferred in terms of preventing film chipping. Incidentally, the homopolyethylene terephthalate herein does not exclude inclusion of a diethylene glycol component that is inevitably included. Examples of a copolymerization component in such a copolyester having a relatively high melting point include copolymerization components in the copolyester described below. The type and copolymerization amount of the copolymerization components should be adjusted so as to allow the melting point to be in the range described above.

When the polyesters constituting both layer A and layer B are a polyester having a melting point in the range of more than 250° C. to 260° C. or less, the effect aforementioned is exerted better, which is preferable.

(Copolyester)

In the present invention, a preferable example of the polyester constituting layer A and/or layer B includes a copolyester having a melting point of 230° C. to 255° C. Employment of such a polyester provides an especially excellent effect of preventing both film cracks and film chipping in good balance during forming. When the melting point is higher than the upper limit, cracks in the film tend to easily occur. On the other hand, when the melting point is lower than the lower limit, film chipping occurs due to heat generation during forming.

The copolymerization component in such a copolyester may be an acid component or an alcohol component.

Examples of the acid components include aromatic dicarboxylic acids other than the main acid component, such as isophthalic acid, phthalic acid, terephthalic acid, and 2,6-naphthalenedicarboxylic acid, and aliphatic dicarboxylic acids, such as adipic acid, azelaic acid, and sebacic acid. Examples of the alcohol components include ethylene glycol, trimethyl glycol, tetramethylene glycol, and the like, and diethylene glycol, polyoxyalkylene glycol, and the like. Other examples include aliphatic diols, such as 1,6-hexanediol, and alicyclic diols, such as 1,4-hexamethylene dimethanol. These may be used singly, or two or more of these can be used in combination. Of these, isophthalic acid and sebacic acid are preferred, and isophthalic acid is particularly preferred.

With respect to the copolymerization proportion of the copolymerization component of the copolyester described above, in the case of layer A, the proportion should be such that the melting point of the copolyester (TmA) is in the range of 230 to 260° C., preferably 235 to 260° C., more preferably 238 to 257° C., and still more preferably 240 to 255° C. When this melting point is lower than the lower limit, chipping occurs due to heat generation during forming processing, and thus it is not preferable. On the other hand, when the melting point is higher than the upper limit, the crystallinity of the copolyester tends to be high, and thus the improving effect of the formability becomes low and cracks easily occur.

In the case of layer B, the proportion should be similarly such that the melting point of the copolyester (TmB) is in the range of 230 to 260° C., preferably 235 to 260° C., more preferably 238 to 257° C., and still more preferably 240 to 255° C. When this melting point is lower than the lower limit, heat resistance becomes poor, and layer B becomes easily flowed and deformed due to heat generation during forming, thereby causing defects easily. When layer B is on the film surface, chipping occurs. On the other hand, when the melting point is higher than the upper limit, the crystallinity of the copolyester tends to be high, and thus the improving effect of the formability becomes low and cracks easily occur.

When the polyesters constituting both layer A and layer B are a copolyester having a melting point in the range of 230 to 260° C., the effect mentioned above is exerted better, which is preferable.

So long as the melting points after film formation are within the above ranges in the copolyesters each constituting layer A and layer B, a copolyester may be employed singly, or in a blend of a copolyester and a homopolyester as resin raw material of either layer. Of these, in terms of formability during forming to a can and stability of film quality, a method employing the former is preferable. In particular, it is preferable to use a copolyester only as resin raw material for both layer A and layer B.

In the case of using a resin raw material composed of a blend of a copolyester and a homopolyester, the amount of the homopolyester is preferably in the range of 30 to 60 wt % based on the total amount of the polyester constituting each layer.

Further, in order to achieve excellent processability such that even under severe conditions of forming, no chipping, cracking, or the like occurs on the can wall portion, the biaxially drawn polyester film of the invention is subjected to heat treatment in the course of a series of can manufacturing steps for the purpose of relaxing the stress accompanying the strain applied to the film of the laminated metal sheet. Thus, |TmB−TmA|, the difference in the melting points between layer A and layer B, is required to be 4° C. or less. A difference in the melting points more than 4° C. is not preferable because, during the heat treatment, the residual stress at the time of can forming is relaxed (contract) in the layer with a higher melting point while the layer with lower melting point melts and flows, resulting in a film surface with a poor appearance.

(Intrinsic Viscosity)

Subsequently, the intrinsic viscosity of the polymer portion of layer A and layer B in the present invention is necessarily 0.46 or more, preferably 0.48 or more, more preferably 0.50 or more. When the intrinsic viscosity is low, breakage frequently occurs during film drawing. Additionally, the film obtained easily causes breakage during forming to a can after lamination on a metal sheet. A high intrinsic viscosity is preferable in terms of formability, but an extremely high intrinsic viscosity may lead to problems such as reduction in the productivity. From such a viewpoint, the intrinsic viscosity is, for example, preferably 0.80 or less, more preferably 0.75 or less.

The intrinsic viscosity (IV) of the copolyester of layer A and layer B herein is obtained in equivalent weight for a resin content by substituting a value (IVa) for IVa in the following formula (2), wherein the value is obtained by dissolving a material copolyester composition used for forming film in o-chlorophenol, then removing a coloring pigment and the like by a centrifuge, and performing measurement in the solution at 35° C.

$$IV = IVa/(1-C) \tag{2}$$

wherein C is a concentration of coloring pigment in each layer.

(Modified Polyolefin Wax)

In the present invention, the surface layer (layer A) is required to contain modified polyolefin wax, into which introduced are functional groups selected from the group consisting of carboxyl group, ketone group and hydroxyl group, at an amount of 0.2 wt % or more, and preferably 0.3 wt % or more (based on the weight of the composition). The amount of modified polyolefin wax lower than the lower limit causes insufficient lubricity on the film surface, generating chippings and scratches easily during forming processing in which a severer load is applied to the film. Though a larger amount of the modified polyolefin wax is preferable from the viewpoint of formability concerning chipping and scratch and the like, a too large amount damages adhesion between a film surface and the printed ink, possibly causing a problem of peeling off of the printed ink in the subsequent steps. From these points, the upper limit of the amount is preferably 2.0 wt %, more preferably 1.8 wt %, and still more preferably 1.4 wt %. In addition, the too large amount causes precipitation of wax on the film surface, resulting in contamination in the film forming process, which is not preferable. The amount of modified polyolefin wax within the above range reduces friction with a metal tool during forming, allowing excellent formability. Further, the introduction of the above-mentioned functional groups into the wax enables the polyester film to secure adhesion with the printed layer laminated on the film even during forming after printing.

Examples of the modified polyolefin wax of the present invention preferably include oxidized polyolefin wax into which functional groups were introduced by oxidization reaction, wherein air is introduced under a molten condition of 140-180° C., to a polymer of an olefinic monomer having 2-8 carbon atoms such as ethylene, propylene, 1-butene, 1-pentene, isobutene, isobutylene or butadiene, or pyrolysate thereof; metal salts obtained by wholly or partially neutralizing an unsaturated carboxylic acid having 3-8 carbon atoms such as acrylic acid, methacrylic acid, vinyl acetate, vinyl propionate, maleic acid, maleic anhydride, itaconic acid, or monomethylmaleinate, with a monovalent or divalent metal cation such as of sodium, potassium, lithium, zinc, magnesium, or calcium; acid-modified polyolefin wax obtained by copolymerizing, block polymerizing or graft polymerizing monomers containing functional groups such as methyl acrylate, methyl methacrylate, ethyl acrylate, ethyl methacrylate, n-propyl acrylate, n-propyl methacrylate, isobutyl acrylate, methacrylate isobutyl, n-butyl acrylate, n-butyl methacrylate, 2-hydroxyethyl acrylate, 2-hydroxyethyl methacrylate, monomethyl maleate, glycidyl acrylate, glycidyl methacrylate, vinyl acetate, acrylic amine, acrylic amide; and their mixtures. Among them, acid-modified polyethylene wax, acid-modified polypropylene wax, oxidized polyethylene wax, oxidized polypropylene wax, or their mixture is preferable. Modified by an acid is, in particular, preferably modified by maleic acid or by maleic anhydride. A carboxyl group, ketone group or hydroxyl group is preferably incorporated in the oxidized wax.

In addition, the acid value of the modified polyolefin wax of the present invention is preferably 1 mgKOH/g or more and less than 50 mgKOH/g, more preferably 5 mgKOH/g or more and less than 40 mgKOH/g, and still more preferably 8 mgKOH/g or more and less than 30 mgKOH/g, and most preferably 12 mgKOH/g or more and less than 28 mgKOH/g. An acid value less than the lower limit such as in the case of, for example, unmodified polyolefin wax, causes insufficient adhesion with ink printed on the film, easily resulting in peeling off of the ink, which is not preferable. An acid value larger than the upper limit causes not only deterioration of heat resistance of the wax but also loss of effective lubrication, resulting in chipping during forming, which is not preferable.

In addition, the weight-average molecular weight of the modified polyolefin wax of the present invention is preferably 2,500 or more and less than 80,000, and more preferably 5,000 or more less than 70,000. Particularly, in the case of polyethylene wax, it is preferably 5,000 or more and less than 20,000, and still more preferably 5,000 or more and less than 18,000, and, in the case of polypropylene wax, preferably 10,000 or more and less than 70,000. A molecular weight less than the lower limit causes deterioration of heat resistance of the wax, inducing deterioration and defect of resin when the wax is added to a polyester film. A molecular weight larger than the upper limit causes loss of effective adhesion, resulting in chipping during forming.

The method for adding the wax to a polyester film is not limited in particular and includes a method of introducing polyester resin pellets and the wax into an extruder and then simultaneously dispersing the wax and forming film, a method of preparing a master pellet of polyester resin with the wax dispersed by using a kneading extruder beforehand and then, when forming film, mixing the dispersed pellet with other polyester resin pellet and introducing to an extruder, and the like, and the latter can disperse wax in a polyester film more uniformly, which is preferable. Commercially available examples of the modified polyolefin wax include acid-modified polypropylene wax, such as UMEX 5200 (Sanyo Kasei), UMEX 5500 (Sanyo Kasei), UMEX 1001 (Sanyo Kasei), UMEX 1010 (Sanyo Kasei), UMEX 100TS (Sanyo Kasei), UMEX 110TS (Sanyo Kasei), Licocene PPMA6452 (Clariant chemicals), Licocene PPMA7452 (Clariant chemicals), Licocene PPMA1332 (Clariant chemicals), Licocene PPMA6252 (Clariant chemicals), Hi-WAX NP0555A (Mitsui Chemicals, Inc.), Hi-WAX NP50605A (Mitsui Chemicals, Inc.), A-C597 series (Honeywell), A-C907 series (Honeywell), and Honeywell A-C950P (Honeywell); acid modified polyethylene wax, such as Hi-WAX 2203A (Mitsui Chemicals, Inc.), Hi-WAX 3202A (Mitsui Chemicals, Inc.), Licocene PEMA4221 (Clariant chemicals), Licocene PEMA4351 (Clariant chemicals), A-C573 series (Honeywell), and A-C575 series (Honeywell); and oxidized polyethylene wax, such as Sun Wax E-310 (Sanyo Kasei), Sun Wax E-330 (Sanyo Kasei), Sun Wax E-250P (Sanyo Kasei), Sun Wax LEL-400P (Sanyo Kasei), LicolubH12 (Clariant chemicals), LicowaxPED521 (Clariant chemicals), LicowaxPED522 (Clariant chemicals), LicowaxPED121 (Clariant chemicals), LicowaxPED153 (Clariant chemicals), LicowaxPED191 (Clariant chemicals), LicowaxPED192 (Clariant chemicals), Hi-WAX 310MP (Mitsui Chemicals, Inc.), Hi-WAX 320MP (Mitsui Chemicals, Inc.), Hi-WAX 405MP (Mitsui Chemicals, Inc.), Hi-WAX 4051E (Mitsui Chemicals, Inc.), Hi-WAX 4052E (Mitsui Chemicals, Inc.), Hi-WAX 4202E (Mitsui Chemicals, Inc.), Hi-WAX 4252E (Mitsui Chemicals, Inc.), A-C670 series (Honeywell), A-C673 series (Honeywell), A-C316 series (Honeywell), A-C325 (Honeywell), A-C330 (Honeywell), A-C392 (Honeywell), and A-C395 series (Honeywell); and that of a desired acid value and weight-average molecular weight can be selected.

(Contact Angle)

In the present invention, the water contact angle on the outer surface of layer A is required to be less than 70°. A water contact angle within the above-mentioned range enables the film to secure adhesion between the polyester film and the printed layer laminated on the film even during forming after printing. A water contact angle no less than the upper limit causes degradation of adhesion between the film surface and the printed layer, easily resulting in peeling off of the ink during forming after printing, which is not preferable.

The method for adjusting a water contact angle on the outer surface of layer A to less than 70° is not limited in particular, it can be adjusted by balancing the amount of the above-mentioned modified polyolefin wax and the degree of an acid value, enabling to keep adhesion to a printed layer by suppressing the contact angle with water, while securing lubricity of the film surface by wax.

(Coloring Pigment)

In the present invention, layer B contains a coloring pigment, and the amount of the coloring pigment is required to be more than 10 wt % and 50 wt % or less, preferably 15 to 40 wt %, and more preferably 15 to 35 wt %, based on the weight of layer B. When the amount of the coloring pigment is lower than the lower limit, the concealability is poor. When the amount exceeds the upper limit, not only the effect for improving concealability is saturated, but also the film becomes fragile, thereby making the film easily broken during film drawing, and further the film obtained is easily cracked and broken during forming into a can after lamination on a metal sheet, which is not preferred. The coloring pigment to be contained in layer B may be inorganic or organic, but is preferably inorganic. Preferred examples of inorganic pigments include alumina, titanium dioxide, calcium carbonate, and barium sulfate. Of these, titanium dioxide is more preferred.

Layer A may or may not contain a coloring pigment as long as the object of the present invention is not disturbed. When a coloring pigment is contained, the amount should be 10 wt % or less based on the weight of layer A. With the coloring pigment at an amount exceeding the upper limit in layer A, when the film is formed into a can or the like after laminated on the metal sheet and the forming is under severe conditions, cracks tend to easily occur in the can wall portion. Moreover, the film becomes brittle, and film breakage tends to easily occur during film drawing. From such viewpoints, the amount is preferably 5 wt % or less, more preferably 3 wt % or less, and still more preferably 1 wt % or less. As the most preferable embodiment in the present invention, there can be provided an embodiment in which layer A substantially contains no coloring pigment. The expression "substantially contains no coloring pigment" as referred to herein means that, for example, particles such as titanium dioxide (being a coloring pigment as well as serving as a slip agent) may be contained, for the purpose of imparting surface smoothness, in a small amount such as 0.5 wt % or less, preferably 0.3 wt % or less, and still more preferably 0.2 wt % or less, based on the weight of layer A. Particularly, no coloring pigment is preferably contained. Thus, even in the forming under severe processing conditions as mentioned above, it is possible to further prevent cracks on the can wall portion and thus to further reduce surface defects. Additionally, it is possible to further prevent the film from becoming brittle and to further prevent film breakage during film drawing.

(Other Additives)

Other additives such as a fluorescent brightener, an antioxidant, a heat stabilizer, an ultraviolet absorbent, and an antistatic agent can be added to layer A and layer B, as required, as long as the object of the present invention is not disturbed. For improving whiteness in particular, a fluorescent brightener is effective. In addition, inert particles may be added to improve handlability in a film forming step and a forming processing step. The inert particles are not limited as long as they are capable of being stable in polymers, and those well-known by themselves can be used, and any of the following is preferably used: a homopolymer or a copolymer selected from polystyrene, polymethylacrylate, polyethylacrylate, polymethylmethacrylate, polyethylmethacrylate, and polydivinylbenzene; organic substances such as polytetrafluoroethylene, polyacrylonitrile, benzoguanamine, and silicone; and inorganic substances such as silica, kaolinite, talc, and graphite. The inert particles preferably have a particle size of 0.1 to 10 µm, and are preferably contained at an amount of 0.002 to 0.5 wt %.

(Thickness)

The thickness of the biaxially drawn polyester film can be appropriately changed as required, but the total thickness is suitably in the range of 6 to 75 µm, especially preferably in the range of 10 to 75 µm, and particularly preferably in the range of 15 to 50 µm. When the thickness is less than the lower limit, chipping or the like easily occurs during forming. On the other hand, films having a thickness of more than the upper limit are over-quality and uneconomical.

Further, the thickness ratio between layer A and layer B (XA/XB: wherein XA is a total thickness of layer A, and XB is a total thickness of layer B) is preferably 0.10 to 0.60, more preferably 0.15 to 0.55, and still more preferably 0.20 to 0.45 in terms of a balance among a suitable surface contact angle, formability, and concealability.

(Production Method)

The method for producing the biaxially drawn colored polyester film for laminating and forming metal sheet of the present invention described above is not particularly limited, and may be such that an undrawn laminate sheet is first produced by a conventionally known film forming method followed by drawing the sheet bi-directionally.

For example, a polyester composition for layer A is prepared by adding modified polyolefin wax and inert particles to a polyester. After being sufficiently dried, the composition is melted in an extruder at a temperature ranging from the melting point to (melting point+50)° C. The melting point in this case is the melting point of the polyester used. At the same time, a polyester composition for layer B is prepared by adding a coloring pigment to a polyester. After being sufficiently dried, the composition is fed to another extruder and melted at a temperature ranging from the melting point to (melting point+50)° C. Subsequently, by a method in which the two molten resins are laminated in a die, such as a simultaneous lamination extrusion method using a multi-manifold die, an undrawn laminated sheet is produced. According to the simultaneous lamination extrusion method, a melt of the resin to form one layer and a melt of the resin to form another layer are laminated in a die and, while maintaining the laminated state, are formed into a sheet through the die.

Next, the undrawn laminated sheet is sequentially or simultaneously biaxially drawn and then heat-set, thereby yielding the film. In the case where the film is formed by sequential biaxial drawing, the undrawn laminated sheet is heated by roll heating, infrared heating, or the like, then first drawn in the longitudinal direction, and next drawn in the lateral direction using a stenter. At this time, the drawing temperature is preferably 20 to 50° C. higher than the glass transition point (Tg) of polyester (preferably, the polyester of layer A). The longitudinal draw ratio is preferably in the range of 2.0 to 5.0, more preferably 2.2 to 4.0, and still more preferably 2.5 to 3.6, and the lateral draw ratio is preferably in the range of 2.5 to 5.0, preferably 2.6 to 4.0, and more preferably 2.6 to 3.7. The temperature of heat setting is preferably selected in the range of 150 to 240° C. and more preferably 150 to 230° C. depending on the melting point of the polyester so as to adjust the film quality.

(Applications)

The biaxially drawn colored polyester film for laminating and forming metal sheet of the present invention is suitably used in applications for lamination on the surface of a metal sheet that will become the outer surface of a container. This is because printability is not usually required in the inner surface of the container.

As a metal sheet on which the biaxially drawn colored polyester film for laminating and forming metal sheet of the present invention is laminated, particularly as a metal sheet for can manufacturing, a sheet of tin, tin-free steel, aluminum, or the like is suitable. Lamination on a metal sheet can be performed, for example, by a method in which the metal sheet is heated to a temperature equal to or higher than the melting point of the film (the melting point of a polyester constituting the layer of the film in contact with the metal sheet), then the film is laminated on the metal sheet, followed by cooling, and the layer of the film to be in contact with the metal sheet is amorphized and fused thereto. In this case, a polyester film for laminating the inner surface of the can is also laminated on the other surface of the metal sheet and fused thereto at the same time. In this case, when the film has a two-layer structure of layer A/layer B, layer B becomes in contact with the metal sheet. When the film has a three-layer structure of layer A/layer B/layer A, any one of the layers A becomes in contact with the metal sheet. Similarly, even in other lamination structure, any structure may be applied as long as layer A forms a film surface layer on the opposite side of the metal sheet. A layer forming the surface layer on the opposite side of layer A, forming such a surface layer of the film, is on the side laminated on the metal sheet.

In this manner, the metal sheet is laminated on the both surfaces by the polyester film for laminating the outer surface of a can and the polyester film for the inner surface of a can, and then formed into a metal can or the like by drawing and ironing in several stages. During the above stages, for the purpose of reducing damage to the film in a subsequent forming processing after relaxing the stress accompanying the strain applied to the film of a laminated metal sheet, heat treatment is performed in the course of a series of can manufacturing steps. The present invention provides an excellent appearance even after the heat treatment is performed.

(Characteristic Value)

[Crack]

A sample film was laminated on one side of a tin-free steel sheet having a thickness of 0.230 mm heated to a temperature equal to or higher than the melting point (approximately, melting point+10° C.) of the polyester of layer B (the surface laminated on the metal sheet) for a two-layer structure sample, or equal to or higher than the melting point (approximately, melting point+10° C.) of the polyester of layer A, which is the surface laminated on the metal sheet for a three-layer structure sample. After water cooling, the laminate sheet was cut into a 150-mm-diameter disc and subjected to five-stage drawing and ironing using a die and a punch, and a 55-mm-diameter container having no seam on the side surface was prepared. With respect to this can, the occurrence of chipping and cracks of the polyester film layer on the can wall is evaluated.

Cracks on the biaxially drawn colored polyester film for laminating and forming metal sheet of the present invention are evaluated by the occurrence of cracks in the polyester film layers on the can wall of 1000 can bodies, wherein it is evaluated as preferable when minute cracks are observed on the film, and as more preferable when no crack is observed on the film.

[Ink Adhesion]

A biaxially drawn film sample was laminated on a metal sheet and a can was manufactured using the sheet. To the can barrel, well-known thermosetting ink (MC QL R-3 Red-3 manufactured by DIC Co., Ltd.) and thermosetting finishing varnish (6WB117 manufactured by DIC Co., Ltd.) were applied and then baked and cured at 200° C. for 30 seconds in a baking oven. The 700 cans obtained were cut open, and the can barrel portion was drawn flat to prepare a test piece. The printed surface of the test piece obtained was scanned at a load of 500 g and a speed of 10 mm/min using a pencil hardness test device (PS-310 manufactured by Marubishi science machine mill Co., Ltd.), wherein the ink adhesion is judged by the maximum pencil hardness at which no peeling off of ink occurs.

Ink adhesion of the biaxially drawn colored polyester film for laminating and forming metal sheet of the present invention is preferably pencil hardness of H, more preferably 2H, and still more preferably 3H or more.

[Concealability]

Using the can body obtained as above, the can barrel is visually observed, and the concealability is evaluated. Concealability of the biaxially drawn colored polyester film for laminating and forming metal sheet of the present invention is preferably evaluated as good when substantially no color of the metal sheet base can be seen, and more preferably evaluated as excellent when no color of the metal sheet base can be seen at all.

EXAMPLES

Hereinafter, the invention will be described in detail with reference to examples. However, the invention is not limited only to these examples. The characteristic values were measured by the following methods. In addition, unless otherwise particularly noted, "part" and "%" in the examples means "part by weight" and "wt %".

(Melting Point)

The melting point of the copolyester was measured by determining the melting peak at a temperature rising rate of 20° C./minute using TA Instruments Q100 DSC. A 10 mg aliquots of the polyester composition was scraped off from each layer of the film and used as a sample.

(Intrinsic Viscosity)

A sample of the polyester composition scraped off from each film layer was dissolved in 25 ml of o-chlorophenol, and then the solution was cooled, and the coloring pigment and the like were removed from the solution by a centrifuge. The solution was measured using an Ostwald viscometer and intrinsic viscosity was calculated using a calibration curve which was prepared from the viscosity of a solution measured at a temperature of 35° C.

(Concentration of Coloring Pigment)

Concentration of the coloring pigment for layer A or layer B was determined as follows: A sample of about 1-2 g of the polyester composition scraped off from each film layer was put into a ceramic crucible and heated at 600° C. for 6 hours in an electricity dryer, and the weight of ash remained in the crucible was divided by the weight of the polyester composition before heating to obtain the concentration. Concentration of coloring pigment for a whole film was determined in the same manner as above using 1 g of the formed biaxially drawn colored polyester film.

(Water Contact Angle)

The contact angle was measured using a contact angle meter manufactured by Kyowa Interface Science Co., Ltd. A film sample was placed in an environment of a temperature of 25° C. and a humidity of 50% for 24 hours or more. Then, 5 mg of distilled water was dropped on the surface of the film where layer A was the outermost layer, and a photograph was taken after 20 seconds from the horizontal direction. An angle formed on the water droplet side by the film and the tangent of the water droplet is taken as the contact angle.

(Thickness of Each Film Layer)

A sample was cut off with a dimension of 2 mm in the longitudinal direction and 2 cm in the width direction, and fixed in an embedding capsule and embedded with epoxy resin. The embedded sample was cut with a microtome (Supercut manufacture by Reichert-Jung) perpendicular to the width direction, to obtain a film slice of 50 μm thickness. The film slice was observed and photographed using a scanning electron microscope (Hitachi 4300SE/N) at an acceleration voltage of 20 kV, and the thickness of each layer was measured from the photograph, and a mean thickness from five points was determined.

(Formability)

A sample film was laminated on one side of a tin-free steel sheet having a thickness of 0.230 mm heated to a temperature equal to or higher than the melting point (approximately, melting point+10° C.) of the polyester of layer B (the surface laminated on the metal sheet) for a two-layer structure sample, or equal to or higher than the melting point (approximately, melting point+10° C.) of the polyester of layer A, which is the surface laminated on the metal sheet for a three-layer structure sample. After water cooling, the laminate sheet was cut into a 150-mm-diameter disc and subjected to five-stage drawing and ironing using a die and a punch, thereby preparing a 55-mm-diameter container having no seam on the side surface. With respect to this can, from the occurrence of chipping and cracks of the polyester film layer on the can wall, the formability was evaluated based on the following criteria.

[Chipping]

Chipping was evaluated by the occurrence of chipping in the polyester film layers on the can wall of 1000 can bodies using the following criteria:

Excellent: Occurrence of chipping or peeling is less than 0.1%.

Good: Occurrence of chipping or peeling is observed in 0.1-0.5% of cans, but the chipping or peeling has practically no problem.

Poor: Occurrence of practically problematic chipping or peeling is observed in 0.1-0.5% of cans.

Very poor: Occurrence of practically problematic chipping or peeling is observed in more than 0.5% of cans.

[Cracks]

Good: No crack is observed in the film.

Fair: Small cracks are observed in the film.

Poor: Large cracks are observed in the film.

(Ink Adhesion)

Ink adhesion was evaluated by pencil hardness test.

A biaxially drawn film sample was laminated on a metal sheet and a can was manufactured using the sheet. To the barrel, well-known thermosetting ink (MC QL R-3 Red-3 manufactured by DIC Co., Ltd.) and thermosetting finishing varnish (6WB117 manufactured by DIC Co., Ltd.) were applied and then baked and cured at 200° C. for 30 seconds in a baking oven. The 700 cans obtained were cut open, and the can barrel portion was drawn flat to prepare a test piece. The printed surface of the test piece obtained was scanned at a load of 500 g and a speed of 10 mm/min using a pencil hardness test device (PS-310 manufactured by Marubishi science machine mill Co., Ltd.), and the maximum pencil hardness causing no peeling of ink was measured to judge the result by the following criteria:

Excellent: The pencil hardness is 3H or higher.

Good: The pencil hardness is 2H.

Fair: The pencil hardness is H.

Poor: The pencil hardness is F or lower.

(Concealability)

Using the can body obtained as above, the can barrel was visually observed, and the concealability was evaluated based on the following criteria.

Excellent: Color of the metal sheet base cannot be seen at all. This sample exhibits excellent concealability.

Good: Substantially color of the metal sheet base cannot be seen at all. This sample exhibits good concealability.

Poor: The color of the metal sheet base can be seen. Concealability is poor.

(Appearance after Heat Treatment)

A can having good formability was maintained in an oven at 250° C. for 90 seconds, and then the appearance of the can was evaluated based on the following criteria.

Good: No appearance defects are observed on the film surface of the can.

Poor: The film surface of the can is roughened, and appearance defects are observed.

Examples 1 to 8 and Comparative Examples 1 to 2, 12 an, 16

The polyester composition for layer A and the polyester composition for layer B show in Table 1 were separately dried and melted at 280° C. for both layer A and layer B. Then, the compositions were laminated by means of a three-layer feed block into a three-layer structure of A/B/A, co-extruded from an adjacent die, and rapidly cooled and solidified to give an undrawn laminate film. Next, this undrawn film was longitudinally drawn at 100° C. at a draw ratio of 3, then laterally drawn at 130° C. at a draw ratio of 3, and subsequently heat-set at 165° C. to give a biaxially drawn polyester film.

As shown in Table 1, rutile titanium dioxide (average particle size: 0.5 μm) was used as a coloring pigment. As an inert particle, silica particles with particle size of 2.0 μm were added in a polyester composition for layer A at an amount of 0.1 wt %, and as the modified polyolefin wax, acid-modified polypropylene wax was used. As for the wax, the acid value was 26 mgKOH/g and the weight-average molecular weight was 45,000. The evaluation results of the biaxially drawn polyester films obtained are shown in Table 2.

Examples 9 to 16 and Comparative Examples 3 to 4 and 13

As shown in Table 1, biaxially drawn polyester films were obtained in the same manner as shown in Examples 1 to 8 except that acid-modified polyethylene wax was used as the modified polyolefin wax. As for the wax, the acid value was 30 mgKOH/g and the weight-average molecular weight was 27,000. The evaluation results of the biaxially drawn polyester films obtained are shown in Table 2.

Examples 17 to 24 and Comparative Examples 5 to 6 and 14

As shown in Table 1, biaxially drawn polyester films were obtained in the same manner as shown in Examples 1 to 8 except that acid-modified polyethylene wax was used as the modified polyolefin wax. As for the wax, the acid value was 15 mgKOH/g and the weight-average molecular weight was 12,000. The evaluation results of the biaxially drawn polyester films obtained are shown in Table 2.

Examples 25 to 32 and Comparative Examples 7 to 8 and 15

As shown in Table 1, biaxially drawn polyester films were obtained in the same manner as shown in Examples 1 to 8 except that acid-modified polyethylene wax was used as the modified polyolefin wax. As for the wax, the acid value was 24 mgKOH/g and the weight-average molecular weight was 8,800. The evaluation results of the biaxially drawn polyester films obtained are shown in Table 2.

Example 33

As shown in Table 1, a biaxially drawn polyester film was obtained in the same manner as in Example 1 except that the composition was laminated into two-layer structure of A/B by means of a two-layer feed block. The evaluation results of the biaxially drawn polyester films obtained are shown in Table 2.

Comparative Examples 9 to 10

As shown in Table 1, biaxially drawn polyester films was obtained in the same manner as shown in Examples 1 to 8 except that polyethylene wax was used instead of the modified polyolefin wax. As for the wax, the acid value was 0 mgKOH/g and the weight-average molecular weight was 18,000. The evaluation results of the biaxially drawn polyester films obtained are shown in Table 2.

Comparative Example 11

As shown in Table 1, a biaxially drawn polyester film was obtained in the same manner as shown in Examples 1 to 8 except that montan wax was used instead of the modified polyolefin wax. As for the wax, the acid value was 17 mgKOH/g. The evaluation results of the biaxially drawn polyester films obtained are shown in Table 2.

TABLE 1

| | | | Surface layer thickness (single layer) (μm) | Water contact angle (°) | Surface layer (layer A) | | | | |
|---|---|---|---|---|---|---|---|---|---|
| | | Total thickness (μm) | | | Polyester | | Coloring pigment | Wax | |
| | Layer structure | | | | Type | Melting point (° C.) | Concentration (wt %) | type | Concentration (wt %) |
| Ex. 1 | 3 layers A/B/A | 20 | 2.5 | 62 | PET-IA4.0 | 248 | 0 | acid-modified polypropylene | 0.2 |
| Ex. 2 | 3 layers A/B/A | 20 | 2.5 | 65 | PET-IA4.0 | 248 | 0 | acid-modified polypropylene | 0.6 |
| Ex. 3 | 3 layers A/B/A | 20 | 2.5 | 67 | PET-IA4.0 | 248 | 0 | acid-modified polypropylene | 1.2 |
| Ex. 4 | 3 layers A/B/A | 20 | 2.5 | 65 | PET-IA6 | 240 | 0 | acid-modified polypropylene | 0.6 |
| Ex. 5 | 3 layers A/B/A | 20 | 2.5 | 65 | PET-IA4.0 | 248 | 0 | acid-modified polypropylene | 0.6 |
| Ex. 6 | 3 layers A/B/A | 20 | 2.5 | 65 | PET-IA4.0 | 248 | 0 | acid-modified polypropylene | 0.6 |
| Ex. 7 | 3 layers A/B/A | 20 | 2.5 | 65 | PET-IA4.0 | 248 | 0 | acid-modified polypropylene | 0.6 |
| Ex. 8 | 3 layers A/B/A | 20 | 2.5 | 65 | Homo PET | 256 | 0 | acid-modified polypropylene | 0.6 |
| Ex. 9 | 3 layers A/B/A | 20 | 2.5 | 62 | PET-IA4.0 | 248 | 0 | acid-modified polyethylene | 0.2 |
| Ex. 10 | 3 layers A/B/A | 20 | 2.5 | 65 | PET-IA4.0 | 248 | 0 | acid-modified polyethylene | 0.6 |
| Ex. 11 | 3 layers A/B/A | 20 | 2.5 | 67 | PET-IA4.0 | 248 | 0 | acid-modified polyethylene | 1.2 |
| Ex. 12 | 3 layers A/B/A | 20 | 2.5 | 65 | PET-IA6 | 240 | 0 | acid-modified polyethylene | 0.6 |
| Ex. 13 | 3 layers A/B/A | 20 | 2.5 | 65 | PET-IA4.0 | 248 | 0 | acid-modified polyethylene | 0.6 |
| Ex. 14 | 3 layers A/B/A | 20 | 2.5 | 65 | PET-IA4.0 | 248 | 0 | acid-modified polyethylene | 0.6 |
| Ex. 15 | 3 layers A/B/A | 20 | 2.5 | 65 | PET-IA4.0 | 248 | 0 | acid-modified polyethylene | 0.6 |
| Ex. 16 | 3 layers A/B/A | 20 | 2.5 | 65 | Homo PET | 256 | 0 | acid-modified polyethylene | 0.6 |
| Ex. 17 | 3 layers A/B/A | 20 | 2.5 | 63 | PET-IA4.0 | 248 | 0 | oxidized polyethylene | 0.2 |
| Ex. 18 | 3 layers A/B/A | 20 | 2.5 | 67 | PET-IA4.0 | 248 | 0 | oxidized polyethylene | 0.6 |
| Ex. 19 | 3 layers A/B/A | 20 | 2.5 | 69 | PET-IA4.0 | 248 | 0 | oxidized polyethylene | 1.2 |
| Ex. 20 | 3 layers A/B/A | 20 | 2.5 | 67 | PET-IA6 | 240 | 0 | oxidized polyethylene | 0.6 |
| Ex. 21 | 3 layers A/B/A | 20 | 2.5 | 67 | PET-IA4.0 | 248 | 0 | oxidized polyethylene | 0.6 |
| Ex. 22 | 3 layers A/B/A | 20 | 2.5 | 67 | PET-IA4.0 | 248 | 0 | oxidized polyethylene | 0.6 |
| Ex. 23 | 3 layers A/B/A | 20 | 2.5 | 67 | PET-IA4.0 | 248 | 0 | oxidized polyethylene | 0.6 |
| Ex. 24 | 3 layers A/B/A | 20 | 2.5 | 67 | Homo PET | 256 | 0 | oxidized polyethylene | 0.6 |

| | Surface layer (layer A) | Substrate layer (layer B) | | | |
|---|---|---|---|---|---|
| | Polymer portion intrinsic viscosity dL/g | Polyester | | Coloring pigment Concentration (wt %) | Polymer portion intrinsic viscosity dL/g |
| | | Type | Melting point (° C.) | | |
| Ex. 1 | 0.73 | PET-IA3.2 | 250 | 18.0 | 0.57 |
| Ex. 2 | 0.70 | PET-IA3.2 | 250 | 18.0 | 0.57 |
| Ex. 3 | 0.66 | PET-IA3.2 | 250 | 18.0 | 0.57 |
| Ex. 4 | 0.70 | PET-IA6 | 240 | 18.0 | 0.55 |
| Ex. 5 | 0.57 | PET-IA3.2 | 250 | 18.0 | 0.57 |
| Ex. 6 | 0.70 | PET-IA3.2 | 250 | 15.0 | 0.60 |
| Ex. 7 | 0.70 | PET-IA3.2 | 250 | 30.0 | 0.48 |
| Ex. 8 | 0.70 | Homo PET | 256 | 18.0 | 0.57 |
| Ex. 9 | 0.73 | PET-IA3.2 | 250 | 18.0 | 0.57 |
| Ex. 10 | 0.70 | PET-IA3.2 | 250 | 18.0 | 0.57 |
| Ex. 11 | 0.66 | PET-IA3.2 | 250 | 18.0 | 0.57 |
| Ex. 12 | 0.70 | PET-IA6 | 240 | 18.0 | 0.55 |
| Ex. 13 | 0.57 | PET-IA3.2 | 250 | 18.0 | 0.57 |
| Ex. 14 | 0.70 | PET-IA3.2 | 250 | 15.0 | 0.60 |
| Ex. 15 | 0.70 | PET-IA3.2 | 250 | 30.0 | 0.48 |
| Ex. 16 | 0.70 | Homo PET | 256 | 18.0 | 0.57 |
| Ex. 17 | 0.73 | PET-IA3.2 | 250 | 18.0 | 0.57 |
| Ex. 18 | 0.70 | PET-IA3.2 | 250 | 18.0 | 0.57 |
| Ex. 19 | 0.66 | PET-IA3.2 | 250 | 18.0 | 0.57 |
| Ex. 20 | 0.70 | PET-IA6 | 240 | 18.0 | 0.55 |
| Ex. 21 | 0.57 | PET-IA3.2 | 250 | 18.0 | 0.57 |
| Ex. 22 | 0.70 | PET-IA3.2 | 250 | 15.0 | 0.60 |
| Ex. 23 | 0.70 | PET-IA3.2 | 250 | 30.0 | 0.48 |
| Ex. 24 | 0.70 | Homo PET | 256 | 18.0 | 0.57 |

TABLE 1-continued

| | | | B | | | | | |
|---|---|---|---|---|---|---|---|---|
| | | | Surface layer thickness (single layer) (μm) | Water contact angle (°) | Surface layer (layer A) | | | |
| | | Total thickness (μm) | | | Ppolyester | | Coloring pigment Concentration (wt %) | Wax Type |
| | Layer structure | | | | Type | Melting point (° C.) | | |
| Ex. 25 | 3 layers A/B/A | 20 | 2.5 | 63 | PET-IA4.0 | 248 | 0 | oxidized polyethylene |
| Ex. 26 | 3 layers A/B/A | 20 | 2.5 | 65 | PET-IA4.0 | 248 | 0 | oxidized polyethylene |
| Ex. 27 | 3 layers A/B/A | 20 | 2.5 | 68 | PET-IA4.0 | 248 | 0 | oxidized polyethylene |
| Ex. 28 | 3 layers A/B/A | 20 | 2.5 | 65 | PET-IA6 | 240 | 0 | oxidized polyethylene |
| Ex. 29 | 3 layers A/B/A | 20 | 2.5 | 65 | PET-IA4.0 | 248 | 0 | oxidized polyethylene |
| Ex. 30 | 3 layers A/B/A | 20 | 2.5 | 65 | PET-IA4.0 | 248 | 0 | oxidized polyethylene |
| Ex. 31 | 3 layers A/B/A | 20 | 2.5 | 65 | PET-IA4.0 | 248 | 0 | oxidized polyethylene |
| Ex. 32 | 3 layers A/B/A | 20 | 2.5 | 65 | Homo PET | 256 | 0 | oxidized polyethylene |
| Ex. 33 | 2 layers A/B | 20 | 2.5 | 65 | PET-IA4.0 | 248 | 0 | acid-modified polypropylene |
| C Ex. 1 | 3 layers A/B/A | 20 | 2.5 | 61 | PET-IA4.0 | 248 | 0 | acid-modified polypropylene |
| C Ex. 2 | 3 layers A/B/A | 20 | 2.5 | 74 | PET-IA4.0 | 248 | 0 | acid-modified polypropylene |
| C Ex. 3 | 3 layers A/B/A | 20 | 2.5 | 61 | PET-IA4.0 | 248 | 0 | acid-modified polyethylene |
| C Ex. 4 | 3 layers A/B/A | 20 | 2.5 | 74 | PET-IA4.0 | 248 | 0 | acid-modified polyethylene |
| C Ex. 5 | 3 layers A/B/A | 20 | 2.5 | 62 | PET-IA4.0 | 248 | 0 | oxidized polyethylene |
| C Ex. 6 | 3 layers A/B/A | 20 | 2.5 | 76 | PET-IA4.0 | 248 | 0 | oxidized polyethylene |
| C Ex. 7 | 3 layers A/B/A | 20 | 2.5 | 61 | PET-IA4.0 | 248 | 0 | oxidized polyethylene |
| C Ex. 8 | 3 layers A/B/A | 20 | 2.5 | 75 | PET-IA4.0 | 248 | 0 | oxidized polyethylene |
| C Ex. 9 | 3 layers A/B/A | 20 | 2.5 | 75 | PET-IA4.0 | 248 | 0 | polyethylene |
| C Ex. 10 | 3 layers A/B/A | 20 | 2.5 | 75 | PET-IA4.0 | 248 | 0 | polyethylene |
| C Ex. 11 | 3 layers A/B/A | 20 | 2.5 | 82 | PET-IA4.0 | 248 | 0 | montanate |
| C Ex. 12 | 3 layers A/B/A | 20 | 2.5 | 65 | PET-IA6 | 240 | 0 | acid-modified polypropylene |
| C Ex. 13 | 3 layers A/B/A | 20 | 2.0 | 65 | PET-IA6 | 240 | 0 | acid-modified polypropylene |
| C Ex. 14 | 3 layers A/B/A | 20 | 4.0 | 67 | PET-IA12 | 228 | 0 | oxidized polyethylene |
| C Ex. 15 | 3 layers A/B/A | 20 | 2.0 | 65 | PET-IA7.2// PBT | 238 | 0 | oxidized polyethylene |
| C Ex. 16 | 3 layers A/B/A | 20 | 2.5 | 65 | PET-IA4.0 | 248 | 0 | acid-modified polypropylene |

| | B | | | | |
|---|---|---|---|---|---|
| | Surface layer (layer A) | | Substrate layer (layer B) | | |
| | Wax Concentration (wt %) | Polymer portion intrinsic viscosity dL/g | Polyester Type | Melting point (° C.) | Coloring pigment Concentration (wt %) | Polymer portion intrinsic viscosity dL/g |
| Ex. 25 | 0.2 | 0.73 | PET-IA3.2 | 250 | 18.0 | 0.57 |
| Ex. 26 | 0.6 | 0.70 | PET-IA3.2 | 250 | 18.0 | 0.57 |
| Ex. 27 | 1.2 | 0.66 | PET-IA3.2 | 250 | 18.0 | 0.57 |
| Ex. 28 | 0.6 | 0.70 | PET-IA6 | 240 | 18.0 | 0.55 |
| Ex. 29 | 0.6 | 0.57 | PET-IA3.2 | 250 | 18.0 | 0.57 |
| Ex. 30 | 0.6 | 0.70 | PET-IA3.2 | 250 | 15.0 | 0.60 |
| Ex. 31 | 0.6 | 0.70 | PET-IA3.2 | 250 | 30.0 | 0.48 |
| Ex. 32 | 0.6 | 0.70 | Homo PET | 256 | 18.0 | 0.57 |
| Ex. 33 | 0.6 | 0.73 | PET-IA3.2 | 250 | 18.0 | 0.57 |
| C Ex. 1 | 0.1 | 0.73 | PET-IA3.2 | 250 | 18.0 | 0.57 |
| C Ex. 2 | 2.2 | 0.62 | PET-IA3.2 | 250 | 18.0 | 0.57 |
| C Ex. 3 | 0.1 | 0.73 | PET-IA3.2 | 250 | 18.0 | 0.57 |
| C Ex. 4 | 2.2 | 0.60 | PET-IA3.2 | 250 | 18.0 | 0.57 |
| C Ex. 5 | 0.1 | 0.73 | PET-IA3.2 | 250 | 18.0 | 0.57 |
| C Ex. 6 | 2.2 | 0.62 | PET-IA3.2 | 250 | 18.0 | 0.57 |
| C Ex. 7 | 0.1 | 0.73 | PET-IA3.2 | 250 | 18.0 | 0.57 |
| C Ex. 8 | 2.2 | 0.62 | PET-IA3.2 | 250 | 18.0 | 0.57 |
| C Ex. 9 | 0.6 | 0.70 | PET-IA3.2 | 250 | 18.0 | 0.57 |
| C Ex. 10 | 0.2 | 0.73 | PET-IA3.2 | 250 | 18.0 | 0.57 |
| C Ex. 11 | 0.6 | 0.70 | PET-IA3.2 | 250 | 18.0 | 0.57 |
| C Ex. 12 | 0.6 | 0.70 | PET-IA6 | 240 | 23.4 | 0.45 |
| C Ex. 13 | 0.6 | 0.45 | PET-IA6 | 240 | 23.4 | 0.58 |
| C Ex. 14 | 0.6 | 0.70 | PET-IA12 | 228 | 23.4 | 0.56 |
| C Ex. 15 | 0.6 | 0.70 | PET-IA4 | 248 | 22.0 | 0.60 |
| C Ex. 16 | 0.6 | 0.70 | PET-IA3.2 | 250 | 8.0 | 0.65 |

Ex. 1: Example 1,
C Ex. 1: Comparative Example 1

TABLE 2

| | Formability | | Ink adhesion | Conceal-ability | Appearance after heat treatment |
|---|---|---|---|---|---|
| C Ex. 16 | Chipping | Cracks | | | |
| A | | | | | |
| Ex. 1 | Good | Excellent | Excellent | Excellent | Good |
| Ex. 2 | Excellent | Excellent | Excellent | Excellent | Good |
| Ex. 3 | Excellent | Excellent | Good | Excellent | Good |
| Ex. 4 | Good | Excellent | Excellent | Excellent | Good |
| Ex. 5 | Excellent | Good | Excellent | Excellent | Good |
| Ex. 6 | Excellent | Excellent | Excellent | Good | Good |
| Ex. 7 | Excellent | Good | Excellent | Excellent | Good |
| Ex. 8 | Excellent | Fair | Excellent | Excellent | Good |
| Ex. 9 | Good | Excellent | Excellent | Excellent | Good |
| Ex. 10 | Excellent | Excellent | Excellent | Excellent | Good |
| Ex. 11 | Excellent | Excellent | Good | Excellent | Good |
| Ex. 12 | Good | Excellent | Excellent | Excellent | Good |
| Ex. 13 | Excellent | Good | Excellent | Excellent | Good |
| Ex. 14 | Excellent | Excellent | Excellent | Good | Good |
| Ex. 15 | Excellent | Good | Excellent | Excellent | Good |
| Ex. 16 | Excellent | Fair | Excellent | Excellent | Good |
| Ex. 17 | Good | Excellent | Excellent | Excellent | Good |
| Ex. 18 | Excellent | Excellent | Good | Excellent | Good |
| Ex. 19 | Excellent | Excellent | Fair | Excellent | Good |
| Ex. 20 | Good | Excellent | Excellent | Excellent | Good |
| Ex. 21 | Excellent | Good | Excellent | Excellent | Good |
| Ex. 22 | Excellent | Excellent | Excellent | Good | Good |
| Ex. 23 | Excellent | Good | Excellent | Excellent | Good |
| Ex. 24 | Excellent | Fair | Excellent | Excellent | Good |
| B | | | | | |
| Ex. 25 | Good | Excellent | Excellent | Excellent | Good |
| Ex. 26 | Excellent | Excellent | Excellent | Excellent | Good |
| Ex. 27 | Excellent | Excellent | Good | Excellent | Good |
| Ex. 28 | Good | Excellent | Excellent | Excellent | Good |
| Ex. 29 | Excellent | Good | Excellent | Excellent | Good |
| Ex. 30 | Excellent | Excellent | Excellent | Good | Good |
| Ex. 31 | Excellent | Good | Excellent | Excellent | Good |
| Ex. 32 | Excellent | Fair | Excellent | Excellent | Good |
| Ex. 33 | Good | Good | Excellent | Excellent | Good |
| C Ex. 1 | Poor | Excellent | Excellent | Excellent | Good |
| C Ex. 2 | Excellent | Excellent | Poor | Excellent | Good |
| C Ex. 3 | Poor | Excellent | Excellent | Excellent | Good |
| C Ex. 4 | Excellent | Excellent | Poor | Excellent | Good |
| C Ex. 5 | Poor | Excellent | Excellent | Excellent | Good |
| C Ex. 6 | Excellent | Excellent | Poor | Excellent | Good |
| C Ex. 7 | Poor | Excellent | Excellent | Excellent | Good |
| C Ex. 8 | Excellent | Excellent | Poor | Excellent | Good |
| C Ex. 9 | Excellent | Excellent | Poor | Excellent | Good |
| C Ex. 10 | Excellent | Excellent | Poor | Excellent | Good |
| C Ex. 11 | Excellent | Excellent | Poor | Excellent | Good |
| C Ex. 12 | Poor | Fair | Excellent | Excellent | Good |
| C Ex. 13 | Poor | Poor | Excellent | Excellent | Good |
| C Ex. 14 | Very poor | Fair | Excellent | Excellent | Good |
| C Ex. 15 | Good | Good | Excellent | Excellent | Poor |
| C Ex. 16 | Good | Excellent | Excellent | Poor | Good |

Ex. 1: Example 1,
C Ex. 1: Comparative Example 1

In Table 1, PET represents a homopolyethylene terephthalate, and PET-IAx represents an x mol % isophthalic acid-copolymerized polyethylene terephthalate. PET-IAx//PBT is a 50/50 (weight ratio) blend of an x mol % isophthalic acid-copolymerized polyethylene terephthalate and a polybutylene terephthalate.

INDUSTRIAL APPLICABILITY

The biaxially drawn colored polyester film for laminating and forming metal sheet of the present invention has excellent concealability and exhibits excellent formability such that even under severe conditions, for example, of forming into a can after lamination on a metal sheet, the film does not cause chipping or cracking on the can wall portion, and further the film has an excellent appearance after forming into a can and excellent printability. Thus, the film is suitably used for metal cans, such as beverage cans, food cans, and aerosol cans and particularly for the outer surface of these cans.

The invention claimed is:

1. A biaxially drawn colored polyester film for laminating and forming metal sheet, comprising at least two layers:
    a surface layer (layer A) mainly composed of a polyester having a melting point of 230 to 260° C. and modified polyolefin wax, layer A having a polymer component with intrinsic viscosity of 0.46 or more, the modified polyolefin wax with an amount of 0.2 to 2.0 wt % based on the weight of the composition, a coloring pigment with an amount of 10 wt % or less, and a water contact angle on an outer surface of less than 70°; and
    a substrate layer (layer B) mainly composed of a polyester having a melting point of 230 to 260° C. and a coloring pigment, layer B having a polymer component with intrinsic viscosity of 0.46 or more and the coloring pigment with an amount of more than 10 wt % and 50 wt % or less;
    wherein the melting points of the polyesters of layer A and layer B satisfy the following expression (1):

$$|TmB - TmA| \leq 4° C. \tag{1}$$

wherein TmA represents the melting point of the polyester of layer A, and
    TmB represents the melting point of the polyester of layer B.

2. The biaxially drawn colored polyester film for laminating and forming metal sheet according to claim 1, wherein the polyester constituting layer B is a copolyester having a melting point of 230 to 255° C.

3. The biaxially drawn colored polyester film for laminating and forming metal sheet according to claim 2, wherein the polyester constituting layer A is a copolyester having a melting point of 230 to 255° C.

4. The biaxially drawn colored polyester film for laminating and forming metal sheet according to claim 1, wherein the polyester constituting layer A is a copolyester having a melting point of 230 to 255° C.

5. The biaxially drawn colored polyester film for laminating and forming metal sheet according to claim 1, wherein the modified polyolefin wax contains at least one selected from the group consisting of acid-modified polypropylene wax, acid-modified polyethylene wax, oxidized polypropylene wax, and oxidized polyethylene wax.

6. The biaxially drawn colored polyester film for laminating and forming metal sheet according to claim 1, wherein the film is laminated on a surface of a metal sheet that will become the outer surface of a container.

7. The biaxially drawn colored polyester film for laminating and forming metal sheet according to claim 1, wherein the polyester constituting layer A is a first isophthalic acid-copolymerized polyethylene terephthalate having a melting point of 230 to 255° C., and the polyester constituting layer B is a second isophthalic acid-copolymerized polyethylene terephthalate having a melting point of 230 to 255° C.

8. The biaxially drawn colored polyester film for laminating and forming metal sheet according to claim 1, wherein the melting point of the polyester constituting layer A is lower than the melting point of the polyester constituting layer B.

* * * * *